United States Patent
Lin et al.

(10) Patent No.: US 8,764,246 B2
(45) Date of Patent: Jul. 1, 2014

(54) LIGHT UNIT WITH LIGHT GUIDING DEVICE

(75) Inventors: Min-Feng Lin, Tainan (TW); Yung-Tien Cheng, Tainan (TW)

(73) Assignee: TYC Brother Industrial Co., Ltd., Tainan (TW)

( * ) Notice: Subject to any disclaimer, the term of this patent is extended or adjusted under 35 U.S.C. 154(b) by 224 days.

(21) Appl. No.: 13/491,720

(22) Filed: Jun. 8, 2012

(65) Prior Publication Data
US 2013/0329433 A1 Dec. 12, 2013

(51) Int. Cl.
*F21V 29/00* (2006.01)
(52) U.S. Cl.
USPC .......................................... 362/294; 362/615
(58) Field of Classification Search
CPC ............................ F21Y 2101/02; F21V 29/004
USPC ................................... 362/294, 615, 555, 547
See application file for complete search history.

(56) References Cited

U.S. PATENT DOCUMENTS

| 7,380,962 | B2 * | 6/2008 | Chaves et al. | 362/293 |
| 7,506,998 | B2 * | 3/2009 | Ansems et al. | 362/245 |
| 7,600,908 | B2 * | 10/2009 | Chang et al. | 362/623 |

* cited by examiner

*Primary Examiner* — Vip Patel
(74) *Attorney, Agent, or Firm* — Rosenberg, Klein & Lee

(57) ABSTRACT

A light unit includes a light guiding body having a light entrance face. A base has a curved oval surface defined therein which has a first focus and a second focus. A light emitting unit is located at the first focus and generates light beams which pass through the second focus and enter into the light guiding body via the light entrance face. The base has a heat dissipating unit connected to outside thereof. The light beams generated from the light emitting unit are completely guided into the light guiding body to have high illumination efficiency. The heat dissipating unit brings the heat away from the light unit.

9 Claims, 3 Drawing Sheets

LIGHT UNIT WITH LIGHT GUIDING DEVICE

FIELD OF THE INVENTION

The present invention relates to a light unit with a light reflection device, and more particularly, to a light unit whose light beams are correctly reflected and guided into the light guiding body.

BACKGROUND OF THE INVENTION

The conventional light unit is disclosed in FIG. 1 and generally comprises a light guiding member 10 which has a light entrance face 101. A fixing member 20 has a Light Emitting Diode (LED) 201 connected thereto and a distance is formed between the LED 201 and the light entrance face 101. When the LED 201 generates light beams, the light beams enter the light guiding member 10 via the light entrance face 101 so that the light guiding member 10 has illumination feature.

However, because there is a certain distance between the LED 201 and the light entrance face 101, some of the light beams generated from the LED 201 cannot pass through the light entrance face 101. In other words, there is a luminous flux loss, only a part of the light beams generated from the LED 201 successfully passes through the light entrance face 101 and enters into the light guiding member 10. Therefore, the illumination feature is not satisfied.

Furthermore, the smaller area that the light entrance face 101 is, the lesser the light beams passes through the light entrance face 101 and enters into the light guiding member 10. In other words, the loss of luminous flux is significant so that the light unit has low efficiency. When the light beams generated from the LED 201 are emitted within a wider angle, the luminous flux will be lost during the travel between the LED 201 and the light entrance face 101.

The present invention intends to provide a light unit that improves the shortcomings of the conventional light unit and the light beams generated from the LED can successfully pass through the light entrance face and enter into the light guiding member.

SUMMARY OF THE INVENTION

The present invention relates to a light unit and comprises a light guiding body having a light entrance face. A base has a curved oval surface defined therein which has a first focus and a second focus. A light emitting unit is located at the first focus and generates light beams which pass through the second focus and enter into the light guiding body via the light entrance face. The base has a heat dissipating unit connected to outside thereof.

Preferably, the light emitting unit is connected to a fixing unit.

Preferably, the fixing unit is integrally made with the base.

Preferably, the base is made integrally and the inside of the base is a half oval curved surface which is based on a short axis of the base.

Preferably, the base comprises at least one reflector which forms a portion of the curved oval surface.

Preferably, the heat dissipating unit comprises multiple fins.

Preferably, the second focus is located on the light entrance face.

Preferably, the second focus is located in the light guiding body.

Preferably, the base is made by metal, plastic or ceramics.

The primary object of the present invention is to provide a light unit wherein the light emitting unit is located at the first focus of the base and the light beams generated by the light emitting unit completely enter the light guiding body via the light entrance face so that the light unit has better optical efficiency. The heat dissipating unit on the outside of the base brings the heat from the light unit.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
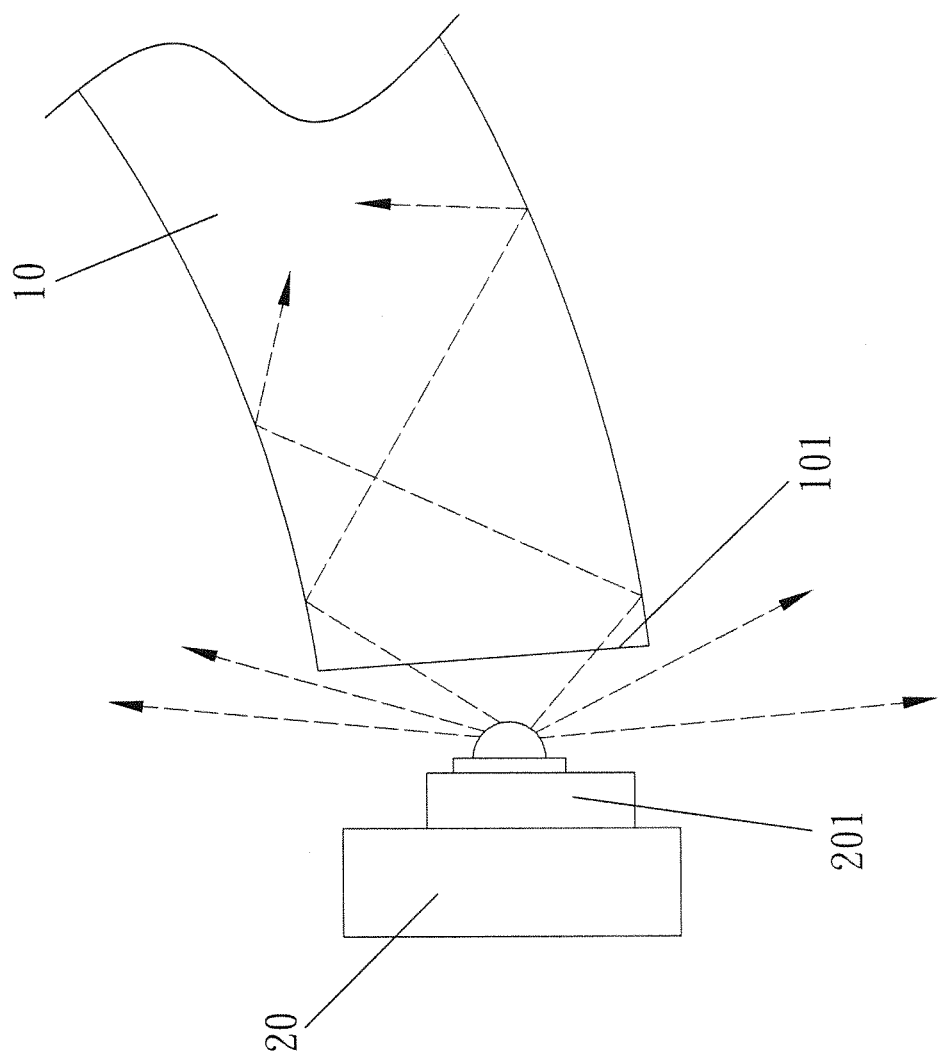
FIG. 1 shows the conventional light unit.
Figure 2:
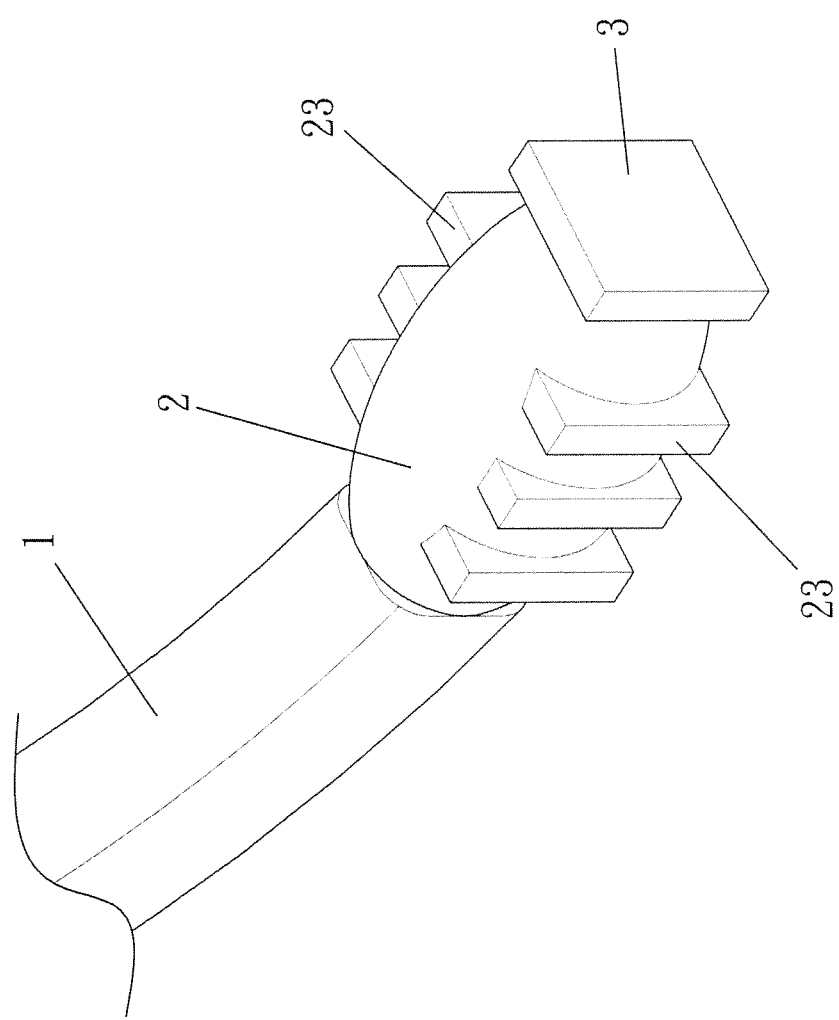
FIG. 2 is a perspective view to show the light unit of the present invention.
Figure 3:
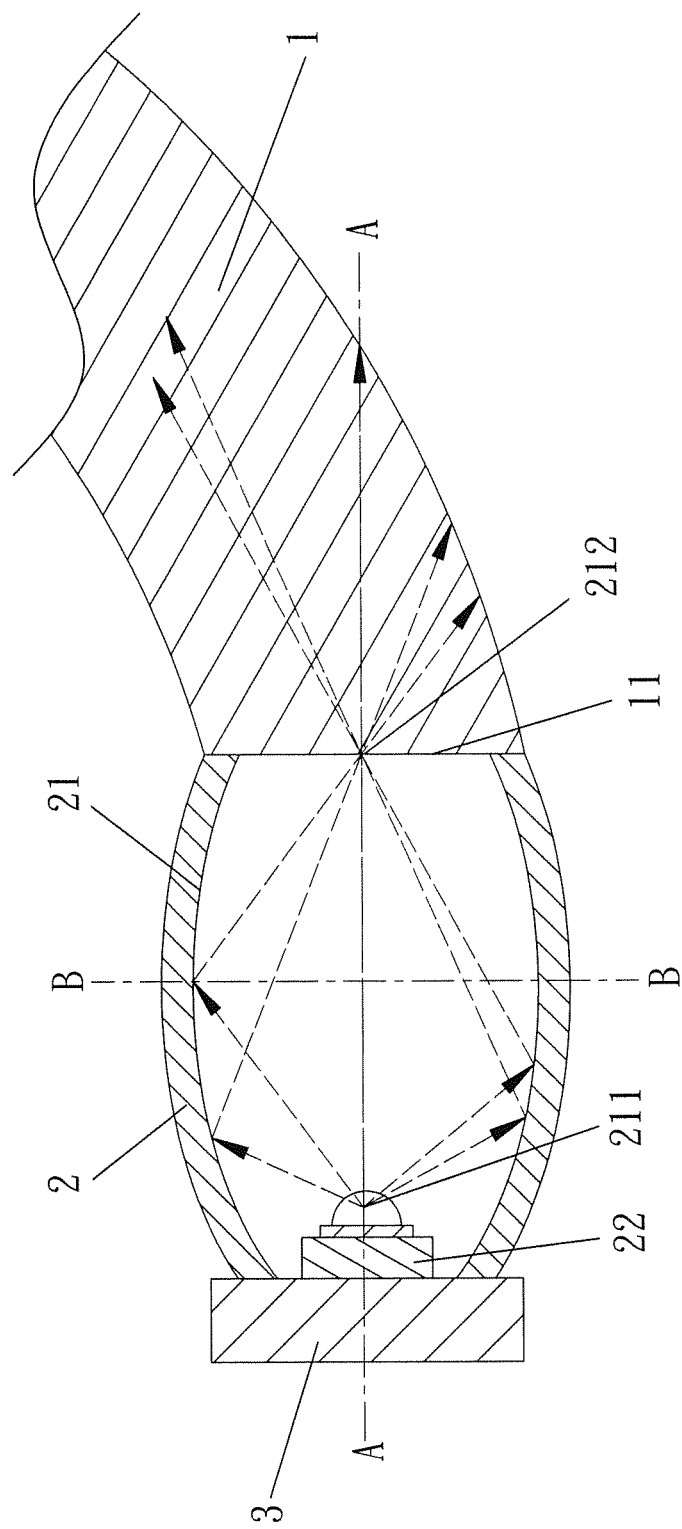
FIG. 3 shows the travel of the light beams of the light unit of the present invention.

Referring to FIGS. 2 and 3, the light unit of the present invention comprises a light guiding body 1 having a light entrance face 11. A base 2 made by metal, plastic or ceramics, has a curved oval surface 21 defined therein which has a first focus 211 and a second focus 212. A light emitting unit 22 is located at the first focus 211 and the light emitting unit 22 is a Light Emitting Diode in this embodiment. The light emitting unit 22 located at the first focus 211 and generates light beams which pass through the second focus 212 and enter into the light guiding body 1 via the light entrance face 11. The base 2 has a heat dissipating unit 23 connected to outside thereof and the heat dissipating unit 23 comprises multiple fins.

A fixing unit 3 is integrally made with the base 2 and the light emitting unit 22 is connected to the fixing unit 3.

The base 2 can be made in two different ways, the first one is that the base 2 is made integrally. The base 2 has a long axis A and a short axis B. The inside of the base 2 is a half of the oval curved surface 21 which is based on the short axis B of the base 2. When in use, the end surface of the base 2 is matched with the light entrance face 11 of the light guiding body 1. The second way is that the base 2 comprises at least one reflector which can be connected to the base 2 and forms a portion of the curved oval surface 21. For instance, the reflector is composed of two half parts and each part is a half of the curved oval surface 21. The two parts are connected to each other or the two parts are connected to form the base 2 by bolts (not shown).

As shown in FIG. 3, the travels of the light beams that are generated from the light emitting unit 22 at the first focus pass through the second focus 212, or the light beams travels to the curved oval surface 21 and then are reflected and pass through the second focus 212. In other words, all of the light beams pass through the second focus 212 and enter into the light guiding body 1 via the light entrance face 11 so that the light guiding body 1 has high efficiency of illumination feature. The fins of the heat dissipating unit 23 on the outside of the base 2 brings the heat from the light emitting unit 22 to keep the light unit functioning properly. It is noted that the second focus 212 is located on the light entrance face 11 as shown in FIG. 3. The second focus 212 is alternatively located in the light guiding body 1. Both arrangements of the second focus 212 can guide the light beams into the light guiding body 1.

The light beams from the light emitting unit 22, regardless of the emitting directions and angles, can pass through the second focus 212 by the curved oval surface 21 and enter into the light guiding body 1. The light emitting unit 22 is not restricted or limited, as long as the light entrance face 11 is located corresponding to the light emitting unit 22 located at the first focus 211. The second focus 212 can be located on the light entrance face 11 or located in the light guiding body 1. Both arrangements of the second focus 212 can guide the light beams into the light guiding body 1.

Compared with the conventional light unit which has luminous flux loss, the light beams of the present invention are guided into the light guiding body 1 by the curved oval surface 21 so as to have higher optical efficiency.

The present invention has good heat dissipating feature so that when the light unit is used as a head light of vehicles, the light guiding body for vehicle head lights requires to be longer so that the travel distance for the light beams is longer. The LEDs used in the head light is at least 1-2 watts so that significant heat is generated when the LEDs are used. The fins of the heat dissipating unit 23 of the present invention can bring the heat away from the light unit.

While we have shown and described the embodiment in accordance with the present invention, it should be clear to those skilled in the art that further embodiments may be made without departing from the scope of the present invention.

What is claimed is:

1. A light unit comprising:
   a light guiding body having a light entrance face, and
   a base having a curved oval surface defined therein which has a first focus and a second focus, a light emitting unit located at the first focus and generating light beams which pass through the second focus and enter into the light guiding body via the light entrance face, the base having a heat dissipating unit connected to outside thereof.

2. The light unit as claimed in claim 1, wherein the light emitting unit is connected to a fixing unit.

3. The light unit as claimed in claim 2, wherein the fixing unit is integrally made with the base.

4. The light unit as claimed in claim 1, wherein the base is made integrally and an inside of the base is a half oval curved surface which is based on a short axis of the base.

5. The light unit as claimed in claim 1, wherein the base comprises at least one reflector which forms a portion of the curved oval surface.

6. The light unit as claimed in claim 1, wherein the heat dissipating unit comprises multiple fins.

7. The light unit as claimed in claim 1, wherein the second focus is located on the light entrance face.

8. The light unit as claimed in claim 1, wherein the second focus is located in the light guiding body.

9. The light unit as claimed in claim 1, wherein the base is made by metal, plastic or ceramics.

* * * * *